United States Patent [19]

Johnstone

[11] 4,324,692
[45] Apr. 13, 1982

[54] POLYMERIZATION CATALYST AND PROCESS

[75] Inventor: Alexander Johnstone, Stenhousemuir, Scotland

[73] Assignee: BP Chemicals Limited, London, England

[21] Appl. No.: 194,999

[22] Filed: Oct. 8, 1980

[30] Foreign Application Priority Data

Oct. 12, 1979 [GB] United Kingdom ............... 35462/79

[51] Int. Cl.$^3$ .............................................. C08F 4/64
[52] U.S. Cl. ................................ 252/429 B; 526/122
[58] Field of Search ...................................... 252/429 B

[56] References Cited

U.S. PATENT DOCUMENTS

| | | | |
|---|---|---|---|
| 3,163,611 | 12/1964 | Andersen et al. | 252/429 B |
| 3,775,391 | 11/1973 | Jennings et al. | 252/429 B X |
| 4,170,568 | 10/1979 | Kirkwood | 252/429 B X |
| 4,250,286 | 2/1981 | Shipley | 252/429 B X |

*Primary Examiner*—Patrick Garvin
*Attorney, Agent, or Firm*—Brooks, Haidt, Haffner & Delahunty

[57] ABSTRACT

A process for preparing a supported Ziegler catalyst component by reacting together an alcohol and a halogen-containing transition metal compound in the presence of a zinc halide, and impregnating a support material having surface hydroxyl groups with the reaction mixture. The alcohol can be aliphatic or aromatic, for example, isopropanol. The transition metal compound can be, for example, a halide, halo-alkoxide or oxyhalide of titanium, vanadium, zirconium or chromium. The zinc halide is preferably zinc chloride. The supported catalyst component can be activated using conventional Ziegler catalyst activators and used to polymerize 1-olefins.

9 Claims, No Drawings

POLYMERIZATION CATALYST AND PROCESS

The present invention relates to a supported Ziegler polymerisation catalyst component and to a process comprising polymerising 1-olefins therewith.

It has long been known that 1-olefins such as ethylene can be polymerised by contacting them under polymerisation conditions with a catalyst obtained by activating a transition metal-containing component, eg a titanium compound such as titanium tetrachloride, with an activator or co-catalyst, eg an organometallic compound such as triethylaluminium. Catalysts comprising the transition metal-containing component and the co-catalyst or activator are generally referred to in the art as "Ziegler catalysts" and this terminology will be used throughout this specification.

It is also known that the Ziegler catalyst component comprising the transition metal compound can be supported on a carrier material, for example silicon carbide, calcium phosphate, silica, magnesium carbonate, magnesium oxide, magnesium hydroxide or sodium carbonate.

Our British published patent application Ser. No. 1553673 (corresponding to U.S. Pat. No. 4,256,865) discloses a process for the production of a supported Ziegler catalyst component comprising reacting together under anhydrous conditions a halogen-containing transition metal compound other than a fluorine-containing compound and an aliphatic alcohol and simultaneously or subsequently impregnating an anhydrous hydroxyl groups-containing support material comprising magnesium oxide, magnesium hydroxide or magnesium hydroxychloride with the reaction mixture to produce the solid catalyst component.

It is an object of the present invention to provide an improved supported Ziegler catalyst.

Accordingly the present invention provides a process for preparing a supported Ziegler catalyst component comprising reacting together an alcohol and a halogen-containing transition metal compound having the general formula $MOX_{m-2}$ or $M(OR)_{m-n}X_n$, wherein M is a transition metal, X is halogen, R is hydrocarbyl, m is the valency of M and n is an integer from 1 to m, in the presence of a zinc halide, and impregnating a support material containing at least some surface hydroxyl groups with the reaction mixture.

The alcohol employed in the present invention can be any primary, secondary or tertiary alcohol capable of reacting with the halogen-containing titanium compound to liberate hydrogen halide therefrom. Preferred are straight or branched chain aliphatic alcohols containing up to 12 carbon atoms, most preferably containing 1 to 6 carbon atoms, for example, methanol ethanol, isopropanol and isobutanol. Alcohols containing aromatic substituents may be employed if desired, for example phenyl ethanol or benzyl alcohol.

The quantity of alcohol employed is suitably 0.1 to 4.0 moles, preferably 1.0 to 3.5, most preferably 1.5 to 3.0 moles per mole of transition metal compound.

The halogen-containing transition metal compound reacts with the alcohol under the reaction conditions employed to produce by-product hydrogen halide and this may be evolved as gaseous hydrogen halide, or remain in solution if the reaction is carried out in solvent or with excess alcohol, or the hydrogen halide may form a complex with the reaction product. The halogen-containing transition metal compound is suitably a halogen-containing compound of a metal of groups 4A, 5A or 6A of the Periodic Table (Mendeleef). Examples of suitable compounds are halides, halo-alkoxides or oxyhalides of titanium, vanadium, zirconium and chromium or mixtures thereof. Preferred halogen-containing transition metal compounds are those having the general formula $Ti(OR)_{4-n}Cl_n$ wherein R is preferably an alkyl group containing 1-6 carbon atoms. Most preferably n is 2, 3 or 4. Examples of preferred transition metal compounds are $TiCl_4$, $Ti(OC_2H_5)Cl_3$, $Ti:(O$-iso $C_3H_7)Cl_3$ and $VOCl_3$ or mixtures thereof.

The quantity of halogen-containing transition metal compound employed is suitably at least sufficient to give a concentration of transition metal in the final catalyst component in the range 0.1 to 30%, preferably 0.5 to 15% most preferably 1 to 7% based on the total weight of catalyst component. If desired, an excess, for example up to 100 times the concentration in the final catalyst component, of halogen-containing transition metal compound may be employed provided that the final catalyst component contains 0.1 to 30% of transition metal.

The zinc halide employed in the present invention can be the fluoride, chloride, bromide or iodide. Zinc chloride is preferred.

The zinc halide employed must be in a substantially anhydrous condition. The quantity of zinc halide employed is suitably 0.01 to 0.9 grams, preferably 0.1 to 0.55 grams, most preferably 0.1 to 0.2 grams per gram of support material.

The reaction between the halogen-containing transition metal compound and the aliphatic alcohol in the presence of the zinc halide is preferably carried out in an inert solvent, examples of suitable solvents being hexane, cyclohexane, isobutane, isopentane, toluene and mixed aliphatic and aromatic hydrocarbon solvents. The reaction can be carried out at any desired temperature. Normally temperatures in the range 0°–150° C. are found to be satisfactory. Refluxing the mixture in an inert solvent having a bp in the range 40° to 140° C. is a preferred technique of carrying out the reaction.

The reaction between the alcohol and the transition metal compound in the presence of the zinc halide can be taken to completion, ie to a stage where no further substantial change in the chemical composition of the reaction mixture occurs under the chosen reaction conditions, or to incomplete reaction. Preferably the reaction is taken to at least 80% of the theoretical equilibrium completion under the chosen reaction conditions.

The zinc halide can be added at the commencement of the reaction or at any time thereafter provided it is present in the mixture whilst reaction is occurring between the alcohol and the transition metal compound. Preferably the zinc halide is added when no more than half the desired reaction time has elapsed.

The support material containing at least some surface hydroxyl groups employed in the present invention is suitably a particulate material, examples of suitable materials being refractory oxides, for example, silica, alumina, magnesia; or Group 2 metal chlorides, hydroxides or hydroxychlorides, for example, anhydrous magnesium chloride, magnesium or calcium hydroxide or magnesium hydroxychloride. Magnesium oxide is preferred. Grades of magnesium oxide that can be employed in the present invention preferably have a particle size greater than 0.01 micron, for example 0.01 to 500 microns, most preferably 1 to 100 microns. Magnesium oxide having a surface area in the range 1 to 1,000 square meters per gram and a hydroxyl content less than 0.2 OH groups per magnesium atom is particularly preferred. It is preferred to employ magnesium oxide that has been obtained by the thermal decomposition of magnesium hydroxide although magnesium oxides obtained by for example thermally decomposing magnesium carbonate, magnesium nitrate or basic magnesium carbonate or by combustion of magnesium metal are also suitable.

The impregnation step of the present invention wherein the hydroxyl groups-containing support material is impregnated with the reaction mixture can be carried out simultaneously with, or subsequent to, the reaction of the alcohol and transition metal compound in the presence of zinc halide. Preferably the impregnation is carried out subsequently to the said reaction. The impregnation of the hydroxyl groups-containing support material is preferably carried out at a temperature in the range of 0° to 240° C., most preferably in the range of 40° to 140° C. The impregnation can be carried out in the presence of an inert diluent or a solvent for the reaction product of the halogen-containing transition metal compound and the alcohol. Suitable inert diluents (which in some cases are also solvents for the said reaction product) are, for example, saturated aliphatic hydrocarbons such as petroleum ether, butane, pentane, hexane, heptane, methyl cyclohexane and aromatic hydrocarbons such as benzene, toluene and xylene. When an inert diluent or solvent is employed it is often convenient to carry out the impregnation of the magnesium-containing support material at the reflux temperature of the solvent.

Any excess transition metal compound remaining in the catalyst component after the impregnation (ie transition metal compound that has not reacted with or not been absorbed by the support material) is preferably removed therefrom, for example by solvent washing, filtration, centrifuging or other convenient techniques which do not have a deleterious effect on the catalyst.

All stages of the catalyst and catalyst component preparation are preferably carried out in the absence of air and moisture, for example, in an inert dry atmosphere such as dry nitrogen or argon.

The present invention further provides a process for polymerising 1-olefins comprising contacting, under polymerization conditions, the monomeric material with the supported Ziegler catalyst component of the present invention in the presence of a Ziegler catalyst activator.

The polymerisation process according to the present invention can be applied to the polymerisation of 1-olefins eg ethylene or propylene or mixtures of olefins, eg ethylene with other 1-olefins, for example, propylene, 1-butene, 1-pentene, 1-hexene, 4-methyl pentene-1, 1,3-butadiene or isoprene. The process is particularly suitable for the polymerisation of ethylene or copolymerisation of ethylene with up to 40 weight % (based on total monomer) of comonomers, ie one or more other 1-olefins.

Ziegler catalyst activators and the methods by which they are used to activate Ziegler catalysts are well known. Ziegler catalyst activators are organometallic derivatives or hydrides of metals of Groups I, II, III and IV of the Periodic Table. Particularly preferred are the trialkyl aluminium compounds or alkyl aluminium halides, for example triethylaluminium, tributylaluminium and diethylaluminium chloride.

The polymerisaton conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3–30 carbon atoms per molecule. Suitable diluents include, for example, isopentane, isobutane, and cyclohexane. Isobutane is preferred.

The polymerisation can be carried out under continuous or batch conditions.

Methods of recovering the product polyolefin are well-known in the art.

The polymerisation catalyst of the present invention can be used to make high density ethylene polymers and copolymers at high productivity. The catalysts have a high activity and are capable, under particle form process conditions, of producing polymers having a commercially useful particle size distribution.

The invention is further illustrated by the following Examples:

In the Examples the melt index ($MI_{2.16}$) was determined according to ASTM method 1238 using a 2.16 kg load at 190° C.; the units are grammes per 10 minutes.

CATALYST COMPONENT PREPARATION

Examples 1–4

Dry cyclohexane (150 ml) and isopropanol [Examples 1, (55 ml), Examples 2–4, (57 ml)] were added to a flask which had been purged with dry nitrogen. Titanium tetrachloride (36.4 ml) was added slowly, with stirring, and the mixture heated under reflux for 1 hour, during which time some of the HCl produced boiled off. The mixture was cooled to 50° C. and solid zinc chloride was added in varying amounts (see Table). In Example 1 the zinc chloride was added as a solution in isopropanol (2 ml) and in Examples 2–4 as the solid anhydrous material. The mixture was then refluxed for a further 1 hour during which time some more HCl was evolved. The mixture was cooled to 50° C. and magnesia (10 g) added. The mixture was then heated under reflux for a further 2 hours. After cooling, the catalyst compound was washed with cyclohexane (3×250 ml) so that the concentration of titanium in the wash liquor was less than 1 g/liter. The catalyst component was stored under nitrogen.

Comparative Examples 5 and 6

Dry cyclohexane (150 ml) and isopropanol (57 ml) were added to a flask which had been purged with dry nitrogen. Titanium tetrachloride (36.4 ml) was added slowly with stirring and the mixture heated under reflux for 2 hours during which time some hydrogen chloride was evolved. No zinc chloride was added. The mixture was cooled to 50° C. and magnesia (10 g) added. Refluxing was then continued for 2 hours after which the catalyst component was washed with cyclohexane (3×250 ml) to reduce the Ti concentration in the washings to less than 1 g/liter. The catalyst component was stored under $N_2$.

POLYMERISATION OF ETHYLENE

Examples 1-4 and Comparative Examples 5 and 6

Bench scale polymerisation was carried out in a 2.3 liter stainless steel stirred autoclave. The reactor was purged with nitrogen, baked out for 2 hr at 110° C., then cooled to 75° C. The catalyst component was added to the reactor as a slurry in cyclohexane by means of a syringe. The required amount of triethyl aluminum co-catalyst was mixed with 1 liter of dry isobutane and the mixture charged to the reactor. The vessel was reheated to 90° C. and hydrogen (6.9 bar) added. Ethylene was added to bring the total pressure in the reactor to 41.4 bar. Ethylene was added continuously throughout the run to maintain this pressure, the temperature being maintained at 90° C. throughout the polymerisation.

The numerical data relating to catalyst component preparation and polymerisation of ethylene are shown in the Table.

TABLE

| Example No | Amount of $ZnCl_2$ used in catalyst component preparation (g) | Level of $ZnCl_2$ (g $ZnCl_2$ per g MgO used) | Catalyst component fed to polymerisation (mg) | $AlEt_3$ fed to polymerisation (g/g of catalyst component) | Catalyst activity (g polyethylene per g catalyst component) | Polymer properties | |
|---|---|---|---|---|---|---|---|
| | | | | | | $MI_{2.16}$ | Fines level wt % <500um |
| 1 | 1.0 | 0.1 | 96 | 2.3 | 5420 | 19.7 | 9.3 |
| 2 | 2.0 | 0.2 | 93 | 1.0 | 5040 | 5.1 | 21.0 |
| 3 | 2.0 | 0.2 | 93 | 2.4 | 6350 | 14.3 | 19.0 |
| 4 | 5.5 | 0.55 | 103 | 2.2 | 4920 | 14.3 | 79.9 |
| 5 (Comparative) | 0 | 0 | 115 | 2.0 | 3780 | 12.7 | 55.1 |
| 6 (Comparative) | 0 | 0 | 115 | 1.0 | 1720 | 2.5 | 94.3 |

Examples 1 to 4 are according to the present invention and Examples 5 and 6 are by way of comparison. The Examples 1-4 show a higher activity than Comparative Examples 5 and 6 and higher sensitivity to hydrogen (as evidenced by the higher melt index) for a given quantity of $AlEt_3$ (cf Example 2 and Comparative Example 6). It is also evident that the quantity of fine polymer produced is, in general significantly less using the process of the present invention.

I claim:

1. A process for preparing a supported Ziegler catalyst component comprising reacting together an alcohol and a halogen-containing transition metal compound having the general formula $MOX_{m-2}$ or $M(OR)_{m-n}X_n$, wherein M is a transition metal, X is halogen, R is hydrocarbyl, $m$ is the valency of M and $n$ is an integer from 1 to $m$ in the presence of a substantially anhydrous zinc halide so as to liberate hydrogen halide therefrom, and impregnating a support material containing at least some surface hydroxyl groups with the reaction mixture.

2. A process as claimed in claim 1 wherein the alcohol is an aliphatic alcohol containing 1 to 6 carbon atoms.

3. A process as claimed in claim 1 wherein the quantity of alcohol employed is in the range 0.1 to 4.0 moles per mole of transition metal compound.

4. A process as claimed in claim 1 wherein the transition metal M is titanium.

5. A process as claimed in claim 1 wherein the transition metal compound is titanium tetrachloride.

6. A process as claimed in claim 1 wherein the quantity of transition metal compound employed is sufficient to give a transition metal concentration in the final catalyst component in the range 1-7% based on the total weight of said component.

7. A process as claimed in claim 1 wherein the zinc halide is zinc chloride.

8. A process as claimed in claim 1 wherein the quantity of zinc halide employed is 0.01 to 0.9 grams per gram of support material.

9. A process as claimed in claim 1 wherein the support material is magnesium oxide.

* * * * *